United States Patent
Utsumi et al.

(10) Patent No.: US 7,286,775 B2
(45) Date of Patent: *Oct. 23, 2007

(54) IMAGE FORMATION DEVICE ENABLING SWITCHING DISPLAY OF REMAINING DEVELOPING AGENT IN MONOCHROME PRINTING MODE

(75) Inventors: Kazuyoshi Utsumi, Nagano-ken (JP); Ken Yoshizuka, Nagano-ken (JP); Keiichi Taguchi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 320 days.

This patent is subject to a terminal disclaimer.

(21) Appl. No.: 11/032,231

(22) Filed: Jan. 11, 2005

(65) Prior Publication Data
US 2005/0206923 A1    Sep. 22, 2005

(30) Foreign Application Priority Data
Jan. 14, 2004    (JP) ............................. 2004-006186

(51) Int. Cl.
*G03G 15/08* (2006.01)
(52) U.S. Cl. .............................. 399/27; 399/12; 399/13
(58) Field of Classification Search ................. 399/27, 399/81, 12, 13, 227, 258
See application file for complete search history.

(56) References Cited

U.S. PATENT DOCUMENTS
2004/0052538 A1 * 3/2004 Yugeta et al. .................. 399/27

FOREIGN PATENT DOCUMENTS

| JP | 2002-351190 A | | 12/2002 |
| JP | 2002351190 A | * | 12/2002 |
| JP | 2003-43773 A | | 2/2003 |
| JP | 2003-316106 A | | 11/2003 |

* cited by examiner

*Primary Examiner*—David M. Gray
*Assistant Examiner*—Erika J. Villaluna
(74) *Attorney, Agent, or Firm*—Sughrue Mion, PLLC

(57) ABSTRACT

An image formation device has an image carrier and a development device (50) into which development units housing toner are detachably installed. The development units have storage device storing color and toner amount remaining information. And the image formation device operates in monochrome printing mode when development units of the same color are installed. The image formation device has display unit (95) to display the toner remaining amount in development units, and control unit which acquires color and toner amount remaining information in the storage device, and executes control to enable switching between a separate remaining amount display mode (95A, 95C) to separately display on the display unit the toner amount remaining in each of installed development units corresponding to installation positions, and a total remaining amount display mode (95B, 95D) to display on the display unit the total toner amount remaining in installed development units of the same color.

11 Claims, 14 Drawing Sheets

VERTICALLY LOWER DIRECTION

VERTICALLY LOWER DIRECTION

VERTICALLY LOWER DIRECTION

FIG. 9

| CASE | COLOR INFORMATION AT MOUNTING POSITIONS | | | | PRINTING MODE |
|---|---|---|---|---|---|
| | BLACK | MAGENTA | CYAN | YELLOW | |
| A | — | — | — | — | ERROR |
| B | — | — | — | K | K MONOCHROME PRINTING MODE |
| C | — | — | K | — | |
| D | — | — | K | K | |
| E | — | K | — | — | |
| F | — | K | — | K | |
| G | — | K | K | — | |
| H | — | K | K | K | |
| I | K | — | — | — | |
| J | K | — | — | K | |
| K | K | — | K | — | |
| L | K | — | K | K | |
| M | K | K | — | — | |
| N | K | K | — | K | |
| P | K | K | K | — | |
| Q | K | K | K | K | |
| R | K | M | C | Y | COLOR PRINTING MODE |

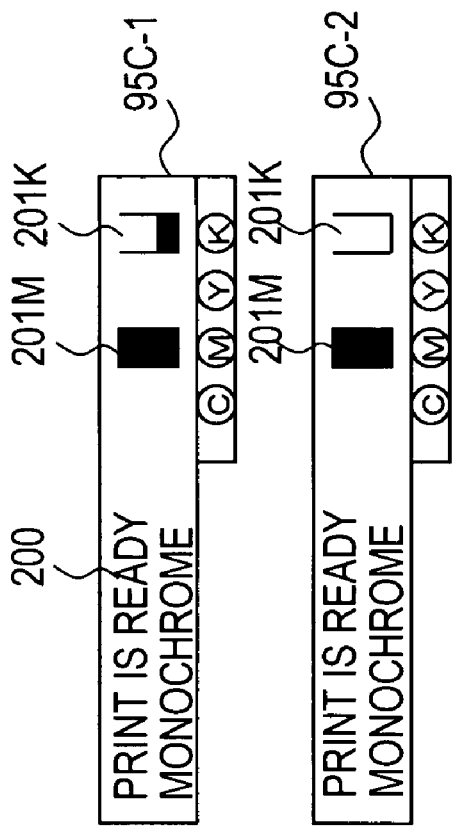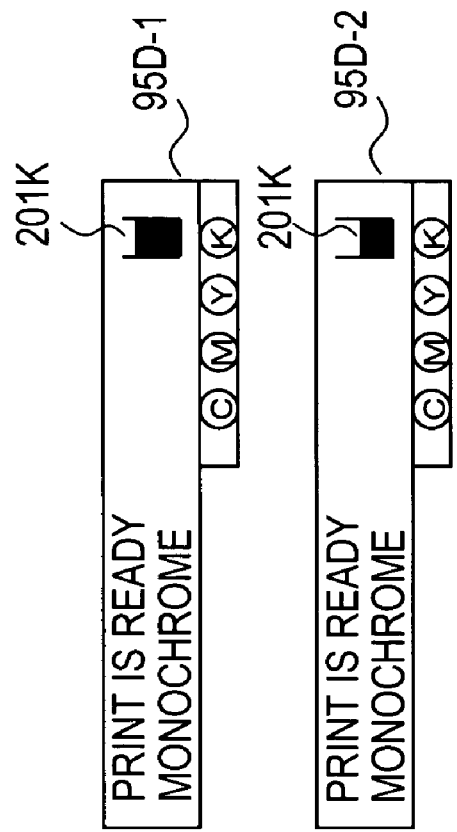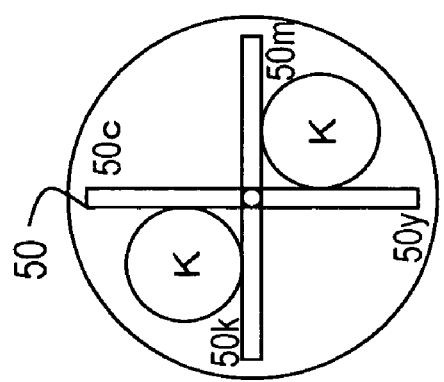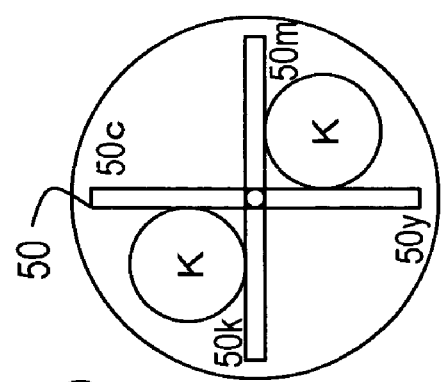
FIG. 11C
FIG. 11D

IMAGE FORMATION DEVICE ENABLING SWITCHING DISPLAY OF REMAINING DEVELOPING AGENT IN MONOCHROME PRINTING MODE

BACKGROUND OF THE INVENTION

1. Field of the Invention

This invention relates to a color printer, fax machine, photocopier, or other image formation device which forms images using electrophotographic techniques, and in particular relates to an image formation device enabling switching of the developer remaining amount display in monochrome printing mode, for enhanced flexibility of management of development units in monochrome printing mode.

2. Description of the Related Art

Image formation devices which form images using electrophotographic technology, provided for example in color printers, have an image carrier in which is formed an electrostatic latent image according to image data; a charging unit which charges the outer surface of the image carrier; an exposure unit which exposes the outer surface of the charged image carrier according to image data, to form an electrostatic latent image; a developer device which supplies toner, as a developing agent, to the electrostatic latent image to develop a toner image; and a transfer unit which causes the toner image to be transferred to a media. The developer device detachably holds a plurality of developing units which house color toners, and has a developer unit holder which causes the appropriate developer unit to be brought into proximity with the image carrier according to the development timing. This developer unit holder is normally a rotatably controlled developing rotary. When the image formation device is in a color printing mode, development units with color toner in a plurality of colors, for example, four colors (yellow or Y, magenta or M, cyan or C, and black or K) is mounted in the developing rotary. When the image formation device is in a monochrome printing mode, such as black and white print mode, a black development unit is mounted in the developing rotary.

An image formation device has been proposed which can be put into a color printing mode in which a four-color development unit is mounted, or into a monochrome printing mode in which only a black development unit is mounted, with the user able to switch between the two modes as appropriate. Such an image formation device has been proposed in, for example, Japanese Patent Laid-open No. 2003-43773 (Publication Date: Feb. 14, 2003), Japanese Patent Laid-open No. 2003-316106 (Publication Date: Nov. 6, 2003), and Japanese Patent Application No. 2003-160059.

In Japanese Patent Laid-open No. 2003-43773 and Japanese Patent Application No. 2003-160059, an image formation device is disclosed in which the color printing mode is set when four color development units are mounted in the developing rotary, and the monochrome printing mode is set when a single black development unit is mounted only in the mounting position for the black development unit of the developing rotary, with no development units mounted in the other mounting positions, which are CMY positions.

In Japanese Patent Laid-open No. 2003-316106, an image formation device in which a black development unit is detachable at any mounting positions in the developing rotary is disclose. In this image formation device, information on the color of the developing agent is read from memory provided in the development unit, to detect which color development units are mounted in which positions of the developing rotary. Specifically, in Japanese Patent Laid-open No. 2003-316106, when development units in the four CMYK colors are mounted, the device operates as a color printer, and when only the black development unit is mounted, the device operates as a black monochrome printer. Further it is disclosed that the black development unit can be mounted with an arbitrary number among 1-4 units, and when plural development units being mounted, an exchange frequency of the development units can be restrained.

Further, an image formation device has been proposed in which, by mounting black development units in all four of the mounting positions of the developing rotary and setting the monochrome printing mode, the number of times development units need to be replaced can be reduced. Such an image formation device is disclosed in Japanese Patent Laid-open No. 2002-351190 (Publication Date: Dec. 4, 2002). In this image formation device, by mounting four black development units in the four mounting positions of the developing rotary for color printing, reading memory provided in the development units, detecting the mounting positions, color information, and amount of toner remaining, and by using the black development units in order, the frequency of replacement of development units in monochrome printing mode can be reduced, even for small-type development devices.

The image formation devices of Japanese Patent Laid-open No. 2003-43773 (Laid-open date: Feb. 14, 2003) and Japanese Patent Application No. 2003-160059 operate in color printing mode when development units in four colors (CMYK) are installed in the development rotary, and operate in monochrome printing mode when only a black development unit is installed in the black position of the development rotary. Hence in order to put the device into monochrome printing mode, the black development unit can only be installed in the black position, and installation of the black development unit in another position is not permitted; hence there is no flexibility or freedom in selecting the installation position for the black development unit, and so there is the problem that convenience to the user is decreased.

On the other hand, the image formation device of Japanese Patent Laid-open No. 2002-351190 (Laid-open date: Dec. 4, 2002), in monochrome printing mode, permits the installation of a development unit, in black or another single color, in an arbitrary position among the four development unit installation positions. However, there is no description of the method of display of the amount of toner remaining when a plurality of development units of the same color are installed, nor is there any description indicating how to improve convenience to the user through such a display.

The image formation device of Japanese Patent Laid-open No. 2003-316106 (Laid-open date: Nov. 6, 2003) also permits the installation of four black development units in four installation positions; but there is no description of the method of display to inform the user of the amount of toner remaining in this case.

When an image formation device is in monochrome printing mode, with increased freedom of installation of development units, the manner of display to the user of the amount of toner remaining in installed development units is important in order to enhance convenience to the user.

SUMMARY OF THE INVENTION

Hence an object of this invention is to provide an image formation device which operates in monochrome printing mode when an arbitrary number of development units of the same color are installed, and which enables display of the remaining amount of developer in order to improve the convenience to the user in adding, replacing, or otherwise managing development units.

In order to attain the above objects, in a first aspect of the invention, an image formation device, comprising: an image carrier which forms latent images; and a development device into which a plurality of development units housing developer are detachably installed, wherein said image formation device operates in monochrome printing mode when development units of the same color are installed in a plurality of installation positions of said development device, and further comprises:

display unit displaying amount of developer remaining within said development units; and, control unit for executing control to enable switching between separate remaining amount display mode, in which information on the remaining amount of developer in each of the plurality of development units installed is displayed on said display unit corresponding to said plurality of installation positions, and total remaining amount display mode, in which amount remaining information based on total amount of developer remaining in said plurality of installed development units of the same color is displayed on said display unit.

In a preferred embodiment of the first aspect, the development units have storage device storing color information and amount remaining information for developer housed therein, and the control unit acquires color information and amount remaining information stored in said storage device of development units installed in the plurality of installation positions of said development device.

In a preferred embodiment of the first aspect, the image formation device further comprising input unit to set the remaining amount display modes, and wherein, in response to the setting through the input unit of the separate remaining amount display mode or total remaining amount display mode, the control unit displays amount remaining information on the display unit in the set remaining amount display mode.

In a preferred embodiment of the first aspect, the development device automatically determines the separate remaining amount display mode or the total remaining amount display mode based on the obtained color information.

In order to attain the above objects, in a second aspect of the invention, an image formation device, comprising: an image carrier which forms latent images; and a development device into which a plurality of development units housing developer are detachably installed, and capable of communicating with a host computer, wherein said image formation device operates in monochrome printing mode when development units of the same color are installed in a plurality of installation positions of said development device, and further comprises:

control unit for executing control to enable switching between separate remaining amount display mode, in which information on remaining amount of developer in each of the plurality of development units installed is displayed corresponding to said plurality of installation positions, and total remaining amount display mode, in which amount remaining information based on total amount of developer remaining in said plurality of installed development units of the same color is displayed; and wherein the control unit outputs, as appropriate, data indicating which of said separate remaining amount display mode and total remaining amount display mode is set, and data to cause display in the respective remaining amount display modes, and causes the host computer to display data in said set mode.

In a preferred embodiment of the first aspect, the development units have storage device for storing color information and amount remaining information for developer housed therein, and the control unit acquires color information and amount remaining information stored in said storage device of development units installed in the plurality of installation positions of said development device.

According to the above first and second aspects, when the image formation device is in monochrome printing mode, a mode in which developer remaining amounts are displayed separately for a plurality of development units, and a mode in which the total developer remaining amount is displayed for a plurality of development units, can be selected, for improved convenience in managing development units when in monochrome printing mode.

BRIEF DESCRIPTION OF THE DRAWINGS

FIG. 9 shows a decision table used in printing mode decision operation;

DESCRIPTION OF THE PREFERRED EMBODIMENTS

Figure 1:
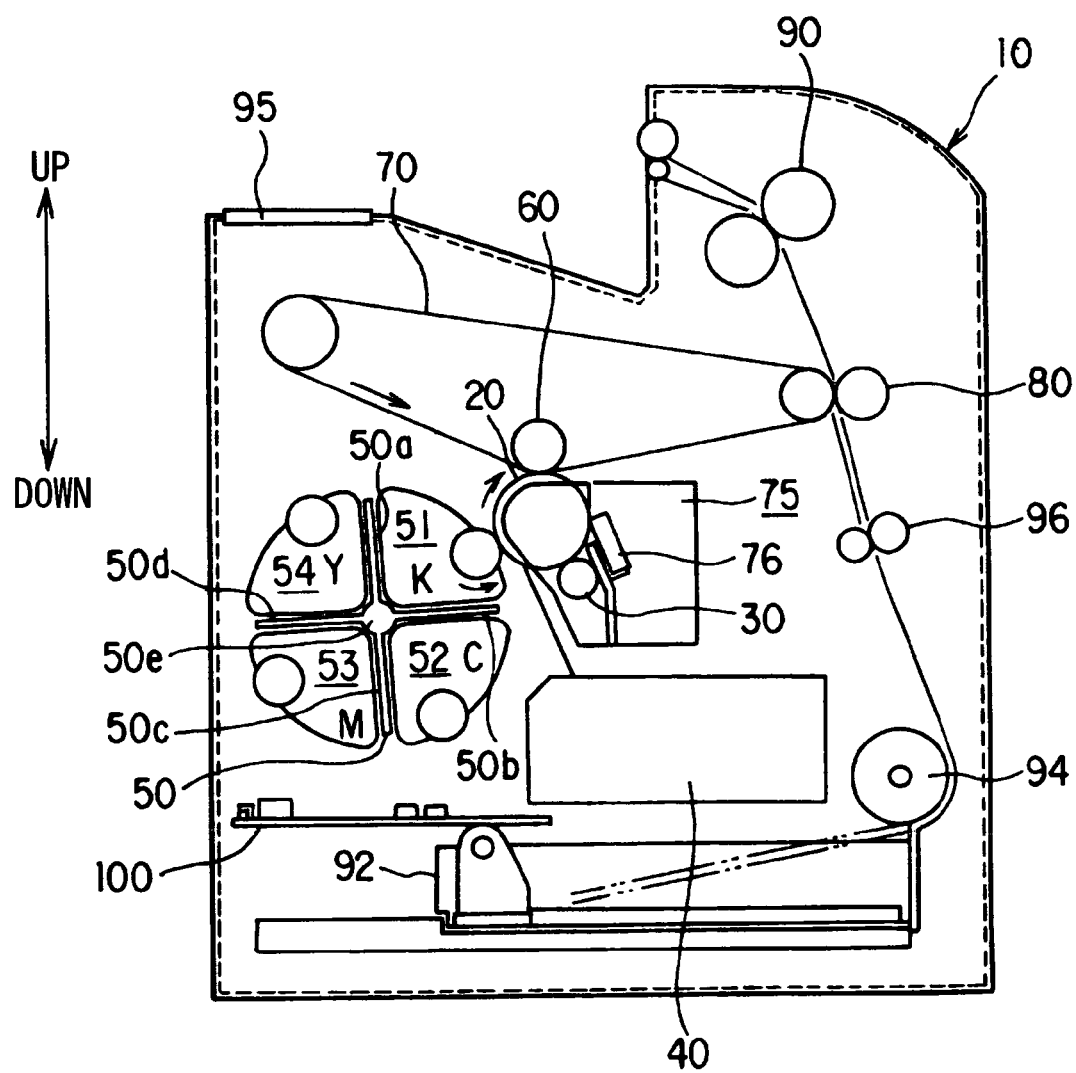
FIG. 1 shows the principal components of the image formation device of a present embodiment (when in color printing mode)

Below, the embodiments of the invention are explained referring to the drawings. However, the technical scope of the invention is not limited to these aspects, but extends to the inventions described in the scope of claims and to inventions equivalent thereto.

FIG. 1 shows the principal configuration of the image formation device of the embodiment. This embodiment is explained taking a laser beam printer 10 as an example of an image formation device. The printer 10 in FIG. 1 is shown in a configuration for the color printing mode.

The printer 10 has, in order in the direction of rotation of the photosensitive drum 20 which is the image carrier carrying latent images, a charging unit 30; an exposure unit 40; a development device 50; a primary transfer unit 60; an intermediate transfer member 70; and a cleaning unit 75. The printer 10 further has a secondary transfer unit 80; a fixing unit 90; a display unit 95 which displays various information to the user; and a control unit 100 which controls these units. The photosensitive drum 20 has a cylindrical conductive base and a photosensitive layer formed on the outer surface thereof, is rotatable about the center axis, and rotates in the clockwise direction, as indicated by an arrow. The charging unit 30 charges the photosensitive drum 20, and the exposure unit 40 irradiates the charged photosensitive drum 20 with a beam from an internal laser, LED array, or other light source, to form a latent image due to static charge on the photosensitive drum 20. The beam irradiation by the exposure unit 40 is controlled by a driving signal, modulated based on image information input from a host computer.

The development device 50 has mounting portions 50a through 50d, into which development units 51 through 54 housing the toner as the developing agent can be detachably mounted, and is a developing rotary, rotatable about the central axis 50e. By causing the development device 50 to rotate, bringing the necessary development units 51 through 54 into proximity with the photosensitive drum 20, and supplying the developing agent to the photosensitive drum 20 on which a latent image is formed, the latent image is developed into an image by the developing agent. In the example of FIG. 1, development units 51 through 54, housing developing agents in the colors black (K), cyan (C), magenta (M), and yellow (Y), are respectively mounted in the mounting portions 50a through 50d of the development device 50, so the printer is put into color printing mode, and in the printing process, the latent image formation on the photosensitive drum 20 and development using the respective developing agents are performed, in the order CMYK. Hence upon each process of latent image formation and development for each color, the development device 50 rotates in the clockwise direction, bringing the development unit of the appropriate color into proximity with the photosensitive drum 20, to perform development in order.

The primary transfer unit 60 transfers the toner image formed on the photosensitive drum 20 to the intermediate transfer member 70. The intermediate transfer member 70 is an endless belt, comprising for example PET film on the surface of which an aluminum evaporation-deposited layer is formed, on the surface of which a semiconducting material is applied, and is driven in rotation at the same angular velocity as the photosensitive drum 20. In color printing mode, images in the CMYK colors are transferred, overlapping, onto the intermediate transfer member 70; in monochrome printing mode, an image in a single color is transferred onto the intermediate transfer member 70. The secondary transfer unit 80 then transfers the toner image formed on the intermediate transfer member 70 to paper or some other printing media, the fixing unit 90 fixes the toner image, transferred onto the printing media, to create a permanent image on the media, and the printing media is then ejected from the printer.

The cleaning unit 75 is provided between the primary transfer unit 60 and the charging unit 30, and has a cleaning blade 76 which is held in contact with the surface of the photosensitive drum 20; after primary transfer, the remaining developing agent (toner) on the photosensitive drum 20 is removed by the cleaning blade 76.

Each of the development units 51 through 54 can be mounted onto and detached from the development device 50, and is provided with storage element, such as for example non-contact and non-volatile memory, which stores color information and remaining amount information for the developing agent. When power is turned on or after a development unit is newly mounted in the development device, the information in the non-volatile memory of the development unit is read. Also, after development, the developing agent remaining amount information in the non-volatile memory of the development unit is updated.

When the CMYK development units 51 through 54 are mounted in their respective predetermined positions in the development device 50, the mounted states are identified by reading information in the above-described non-volatile memory, and the printer 10 operates in color printing mode. In color printing mode, print job data described in a language used for color printing is supplied by the host computer, and formation of electrostatic latent images on the photosensitive drum 20, development by the development unit of the corresponding color, and transfer of the toner image onto the intermediate transfer member 70 by the primary transfer unit 60, are repeated in CMYK order. After the CMYK toner images have been transferred to the intermediate transfer member 70, the color image on the intermediate transfer member 70 is transferred to the paper or other printing media by the secondary transfer unit 80 and is fixed by the fixing unit 90, and the printing media is ejected from the printer.

Even when the CMYK development units are mounted as shown in FIG. 1, if print job data indicating monochrome printing is supplied by the host computer, development is performed by, for example, the black development unit when black monochrome printing is specified, and the monochrome image is formed on the printing media.

Figure 2:
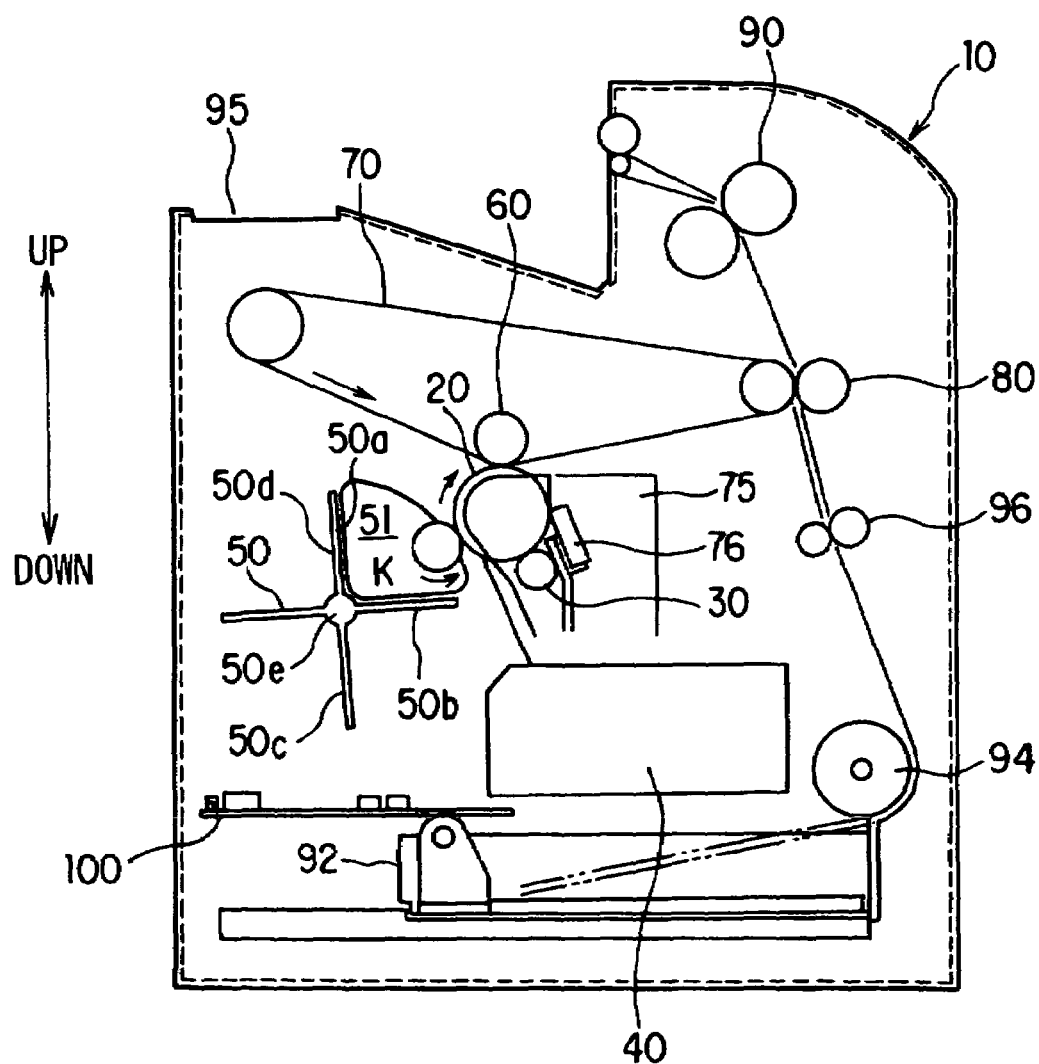
FIG. 2 shows the principal components of the image formation device of a present embodiment (when in monochrome printing mode)
Figure 3:
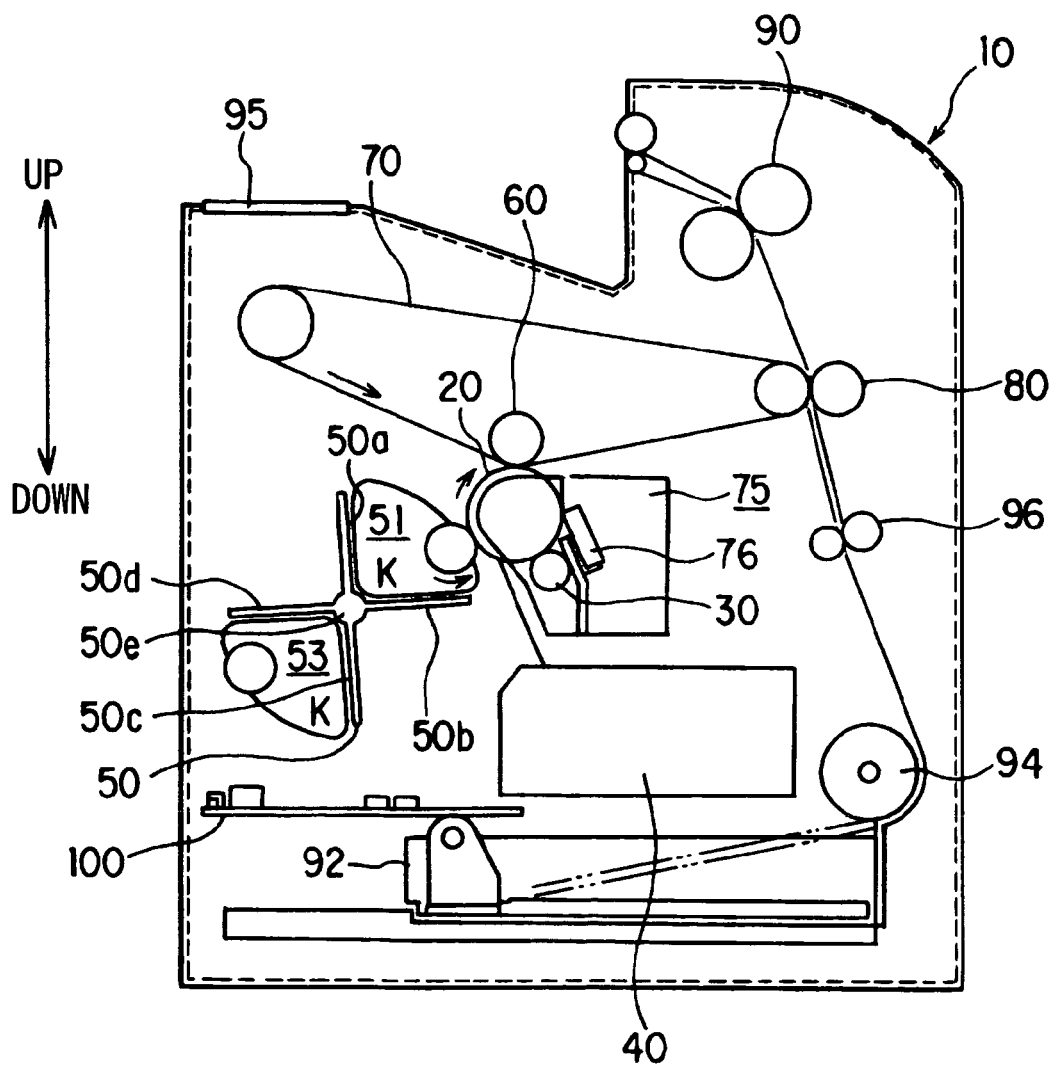
FIG. 3 shows the principal components of the image formation device of a present embodiment (when in monochrome printing mode)
Figure 4:
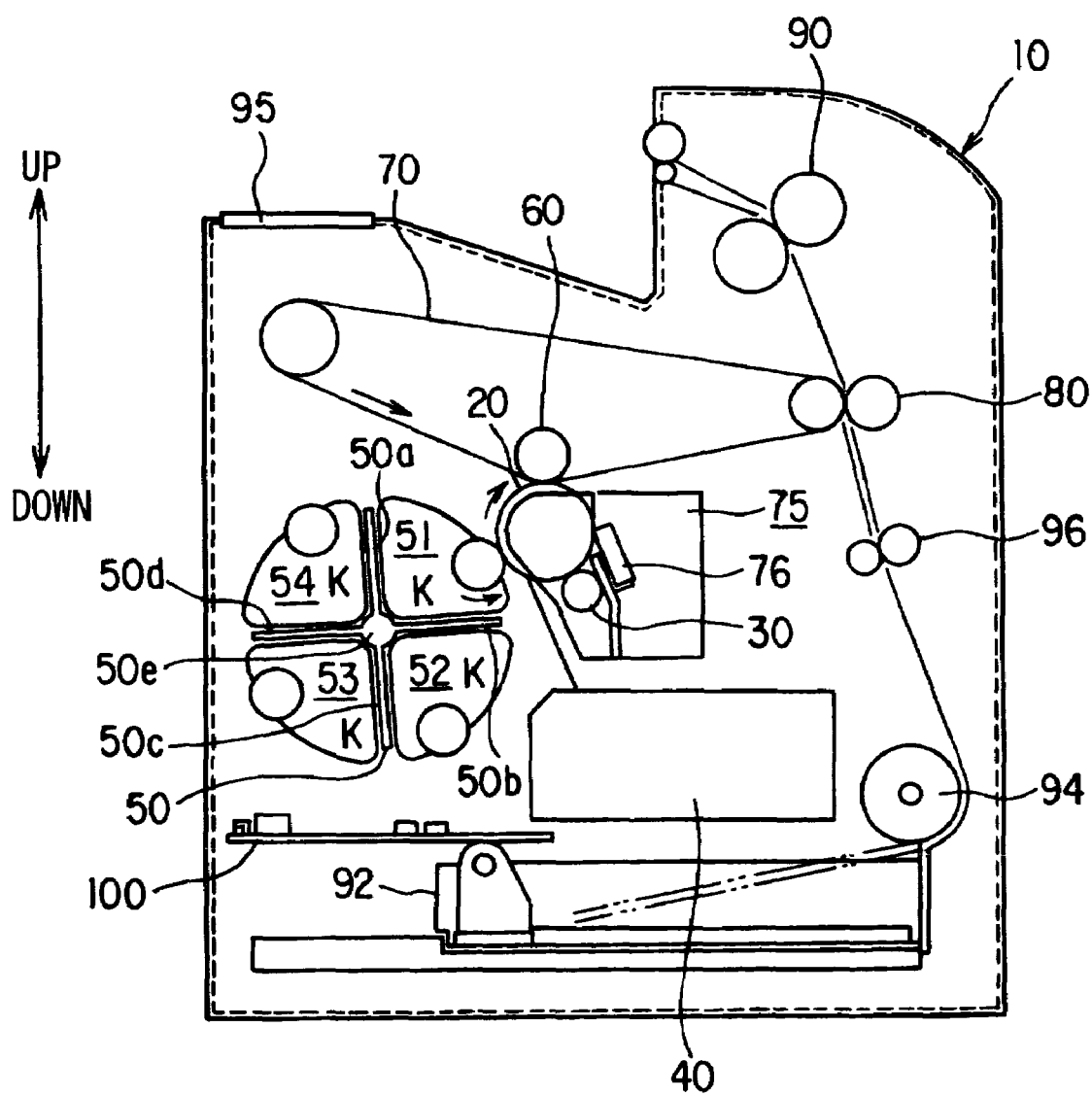
FIG. 4 shows the principal components of the image formation device of a present embodiment (when in monochrome printing mode)

FIG. 2 through FIG. 4 show the principal configuration of the image formation device of the embodiment; in these drawings, the configuration in black monochrome printing mode (single-color printing mode) is shown. In FIG. 2 through FIG. 4, components which are the same as in FIG. 1 are assigned the same reference numbers. In the example of FIG. 2, a black development unit 51 is mounted only in the mounting position 50a for a black development unit of the development device 50. In this case, black color information is read from the non-volatile memory provided in the development unit 51, described below, and the control unit 100 detects that a black development unit 51 is mounted in the mounting position 50a and that development units are not mounted in the other mounting positions, as a consequence of which the monochrome printing mode is detected. Even when a single black development unit is mounted in a mounting position other than the mounting position for black 50a, the control unit 100 similarly detects this mounted state, and so detects the black monochrome printing mode. Operation is similar when a development unit in a color other than black is mounted; in this case, the monochrome printing mode in the color of the developing agent of the mounted unit is detected. When a monochrome printing mode is detected, the printer driver of the host computer is notified of the mode information, and as a result the host computer supplies print job data in a language for monochrome printing.

In the example of FIG. 3, black development units 51 and 53 are also mounted in the magenta mounting position 50c in addition to the black mounting position 50a in the development device 50. By means of the physical engaging means described below, the three color (CMY) development units for color printing can each be mounted only in the respective mounting positions 50b, 50c, 50d determined in advance. On the other hand, a black development unit can be mounted in any of the four mounting positions 50a through 50d. And as shown in FIG. 3, if black development units 51 and 53 are mounted in the black mounting position 50a and in the magenta mounting position 50c, the color information in the non-volatile memory provided in the development units is read, the mounted state is detected by the control unit 100, and the black monochrome printing mode is detected.

Because two black development units 51 and 53 are mounted, in monochrome printing, the development unit with the remaining amount of developing agent is given priority to be rotationally controlled to the position of the photosensitive drum 20 to execute the development process. Also, the toner remaining amount information is maintained in the non-volatile memory of the respective development units 51 and 53, the remaining amount information is read, and whether a development unit is mounted, as well as the remaining amount of toner, are displayed on the display panel 95 for each of the mounting positions 50a through 50d.

Because two black development units 51, 53 are installed, in monochrome printing one of the development units is controlled to be rotated to the position of the photosensitive drum 20, and the development process is executed. The toner amount remaining information in the nonvolatile memory of each of the development units 51, 53 is maintained, the amount remaining information is read, and the amount remaining is displayed on the display panel/operation panel (display unit) 95, which is display means and operation means, in either separate remaining amount display mode, in which development unit installed/not-installed information and toner amount remaining information is displayed for each installation position 50a to 50d, or in total remaining amount display mode, in which the total amount remaining for the two black development units is displayed.

Installation positions of the two black development units can be any two arbitrary positions; in any case, operation is in monochrome printing mode.

In the example of FIG. 4, black development units 51 to 54 are installed in all the installation positions of the development device 50. In this case also, color information is read from the nonvolatile memory of the four development units, and the control unit 100 decides that the mode is monochrome printing mode. Toner amount remaining information is maintained by writing to the nonvolatile memory of the respective development units, and is read and displayed on the display panel 95, either in separate remaining amount display mode, in which the fact that four development units are installed is displayed together with the separate amounts remaining for each, or in total-remaining amount display mode, in which the total amount remaining in the four black development units is displayed.

The display panel/operation panel 95 comprises for example a touch screen; in monochrome printing mode, a user can employ the display panel/operation panel 95 as input means to select and set either separate remaining amount display mode or total remaining amount display mode.

In the above example, color printing mode and monochrome printing mode are identified based on color information in the nonvolatile memory of the development units; but a configuration is possible in which, even if color information is not stored in nonvolatile memory, a user can employ the display panel/operation panel 95 to set the mode. In this case, when in monochrome printing mode, the installation position in which the black development unit is installed is also set from the operation panel 95.

Figure 5:
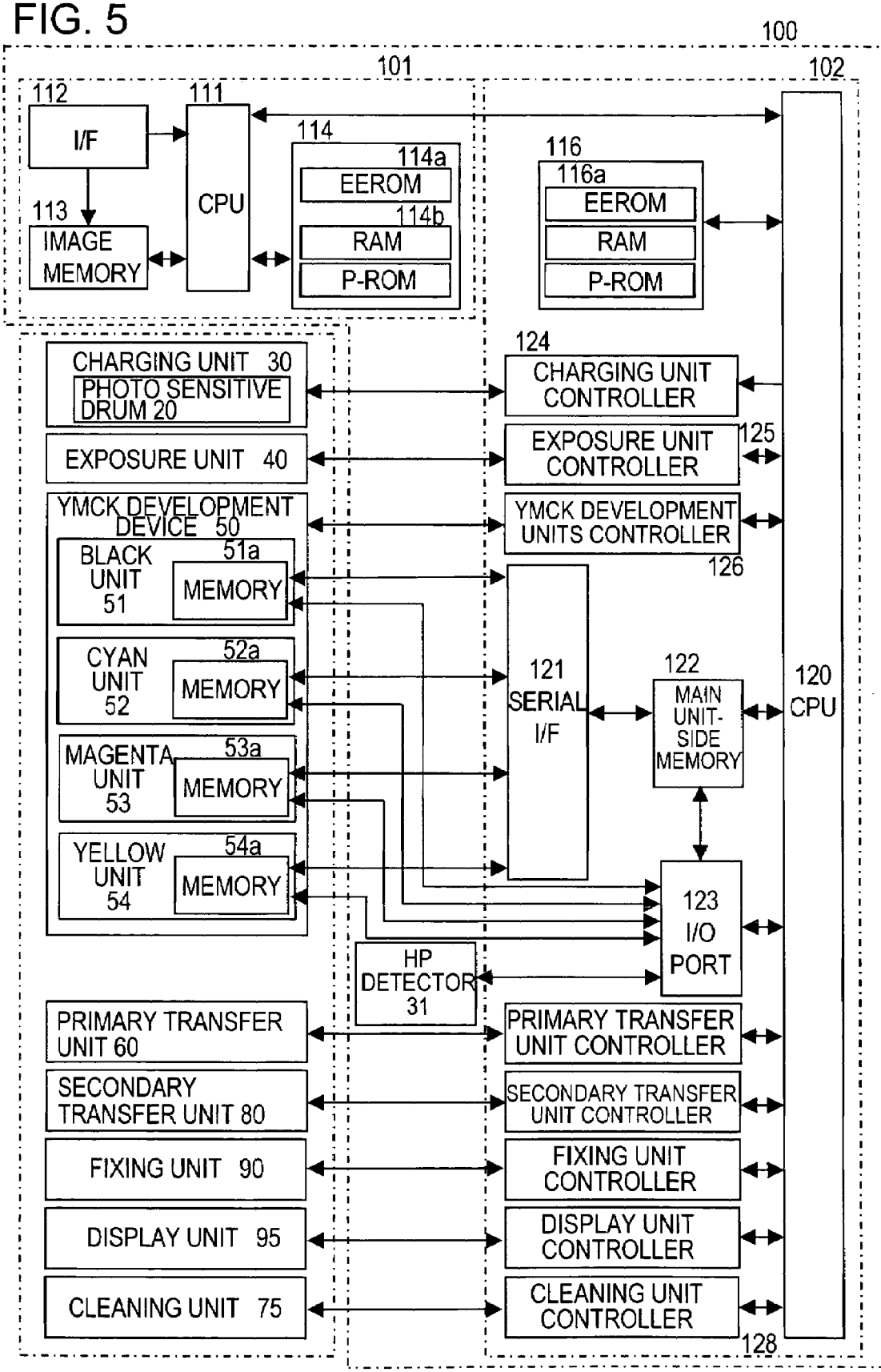
FIG. 5 shows the configuration of the control unit 100 of a present embodiment.

FIG. 5 shows the configuration of the control unit 100 of the present embodiment. The control unit 100 has a main controller 101, which is supplied with print job data by the host computer, performs prescribed image processing and generates control signals and image signals for the engine as well as executing display control of the display panel/operation panel 95, and an engine controller 102 which controls each of the units of the printing engine. The main controller 101 has an interface 112 which receives print job data from the host computer; image memory 113 which stores image data within print job data; a CPU 111 which performs halftone processing and other image processing, sets the display mode, performs automatic discrimination, and controls display on the display panel; and a memory unit 114 having nonvolatile memory 114a and RAM and ROM 114b.

Nonvolatile memory 114a stores printing mode information indicating whether the printer is in color printing mode or in monochrome printing mode, and remaining amount display mode information, indicating whether the printer is in separate remaining amount display mode or in total remaining amount display mode for display of developer remaining amounts while in monochrome printing mode. The printing mode is decided by the main controller at time of power-on according to information from the memory of development units installed in the development device, and the printing mode information thus decided is written to the nonvolatile memory 114a. The remaining amount display mode is set through input settings by the user through the display panel/operation panel 95, and the remaining amount display mode information thus set is written to nonvolatile memory 114a. Or, when set in automatic discrimination mode, based on color information and identification information read from nonvolatile memory of installed development units, the main controller 101 judges the mode to be total amount remaining display mode when development units of the same color are installed in all four installation positions and judges the mode to be separate remaining amount display mode in other prescribed cases described below, and writes the remaining amount display mode information thus judged to nonvolatile memory 114a.

The engine controller 102 has, in addition to the CPU 120, a memory unit 116; serial interface 121; main unit memory 122; input/output port 123; driving control circuits 124, 125, 126 which drive the static charger 30, exposure unit 40, and development device 50; and driving control circuit group 128 which drives the primary transfer unit 60, secondary transfer unit 80, fixing unit 90, display unit 95, and cleaning unit 75. In addition, a detection portion 31 which detects the home position of the development device 50 is provided.

The engine controller 102 is supplied by the main controller 101 with control signals to control the printing process and with image signals to control irradiation by the exposure beam, and executes control of various units. The development units 51 to 54 installed in the development device 50 have development unit memory 51a to 54a respectively. This memory comprises, for example, FeRAM, EEPROM, or other nonvolatile memory, and stores developer color information, developer amount remaining information, the development unit ID (identification information), and other information. When this memory comprises FeRAM, non-contact access via the serial interface 121 is possible; when comprising EEPROM, access via physical contact through the serial interface 121 is possible. At power-on and when a development unit is replaced or additionally installed, the engine controller 102 accesses the development unit memory 51a to 54a, and reads information indicating whether a development unit is installed, the color information, identification information, and similar. During the development process, the developer amount remaining information is updated for development units for which the development process has ended.

The main unit memory 122 comprises for example EEPROM or other nonvolatile memory, and stores parameter values and similar for engine control. The nonvolatile memory 116a in the main unit 116 stores information indicating whether development units are installed in the four installation positions of the development device, and color information and identification information for installed development units. This information is sent from the CPU 120 within the engine controller 102 to the CPU 111 within the main controller 101, and based on this information, the CPU 111 decides the printing mode and the remaining amount display mode.

The amount of developer amount remaining information in development units is read from the nonvolatile memory of the development units, and alternatively the amount remaining may be updated and maintained by the control unit 100 using printing data at the time of development. However, in this case, each time a development unit is replaced the user must reset the amount remaining for the replaced development unit from the display panel/operation panel 95.

Figure 6A:
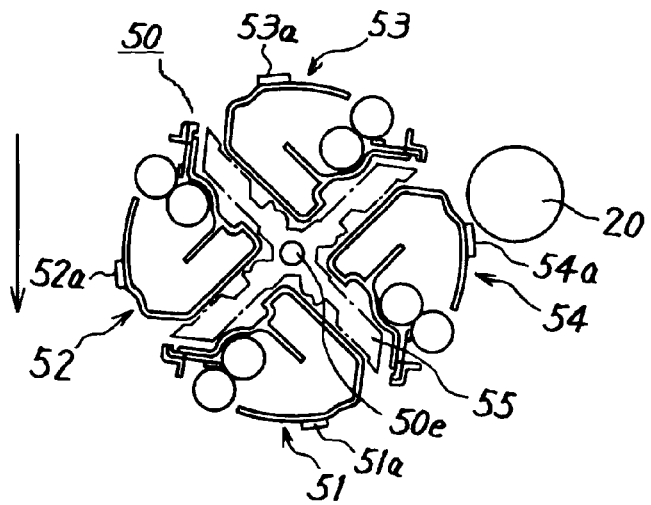
FIG. 6 shows the rotating operation of the development device.
Figure 6B:
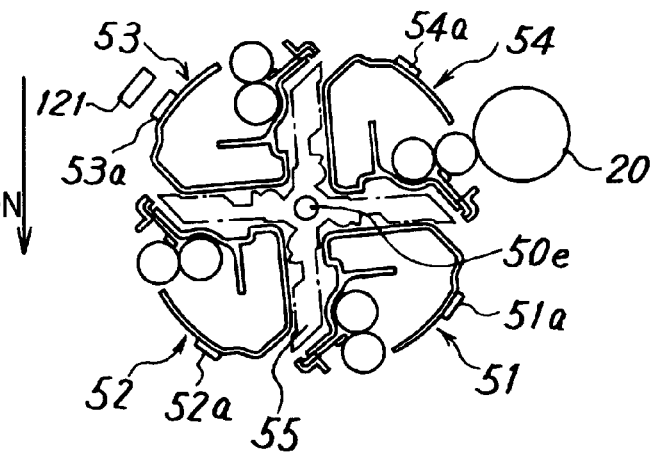
Figure 6C:
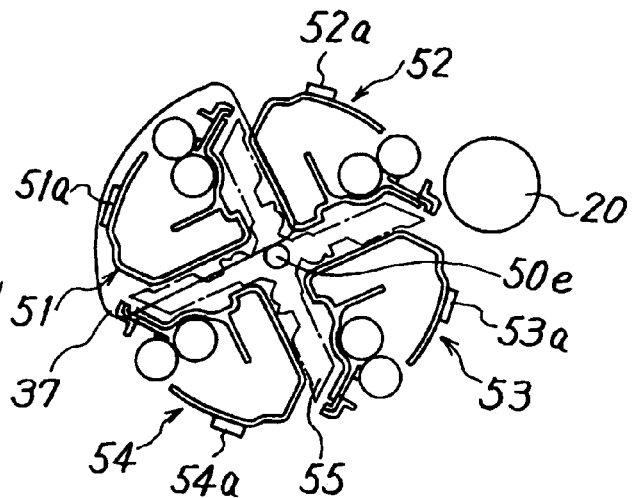
Figure 7A:
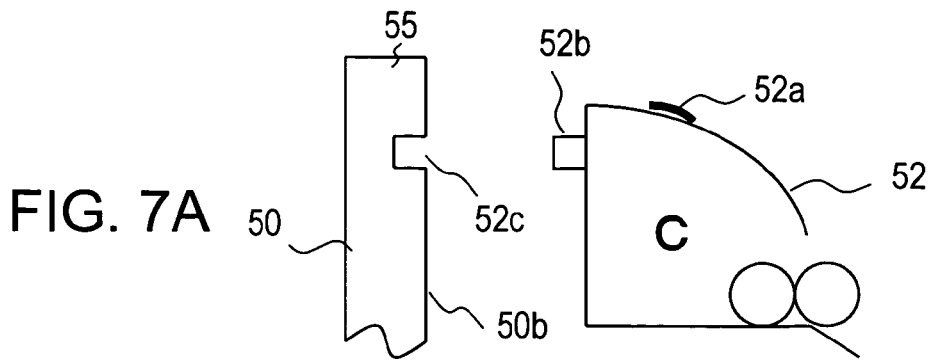
FIG. 7 shows means for joining the development device and development units.
Figure 7B:
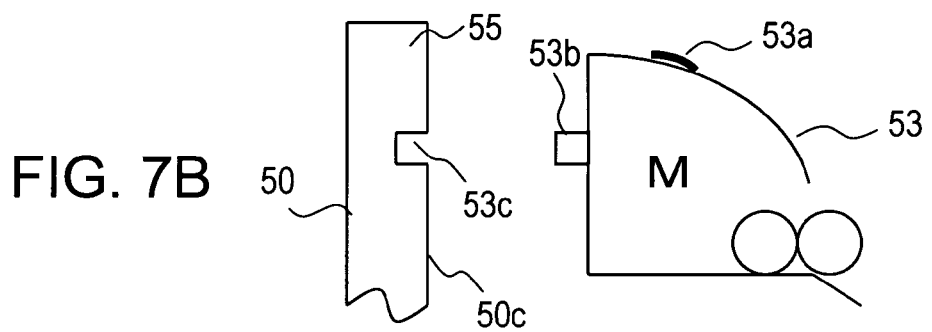
Figure 7C:
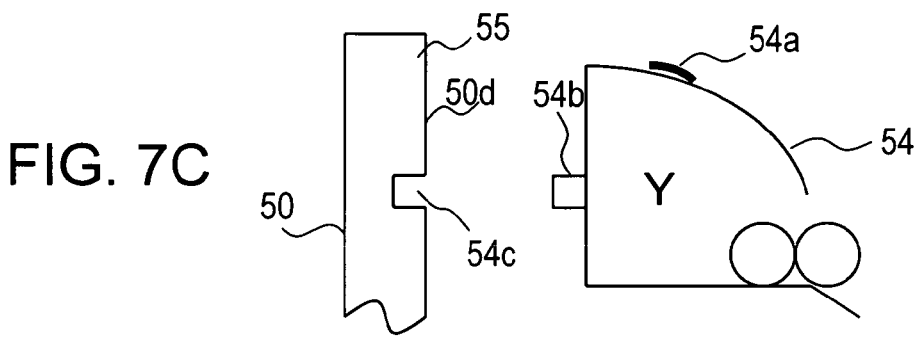
Figure 7D:
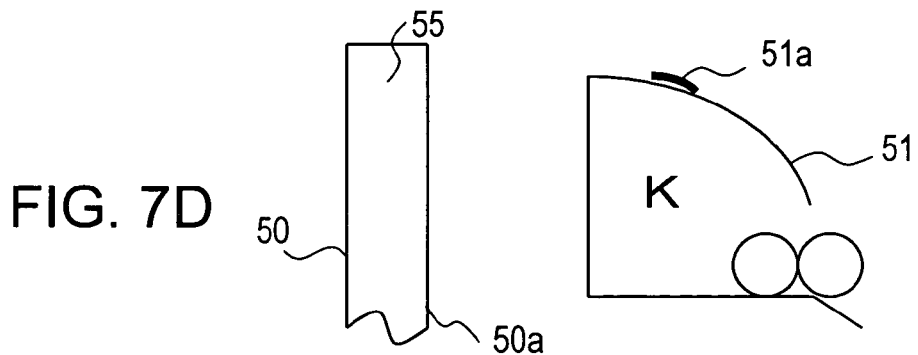

FIG. 6 shows the rotational operation of the development device. In FIG. 6, three positional relationships between the development device 50 with the four development units 51 to 54 mounted and the photosensitive drum 20 are shown. FIG. 6A shows the home position; FIG. 6B shows the development and memory access position; and FIG. 6C shows the development unit detachment position. The development device 50, which is a developing rotary, rotates about the center axis 50e due to a pulse motor, not shown; the center shaft 50e is fixed to a support frame 55 which holds the development unit.

The home position in FIG. 6A is a position detected by the home position detection portion 31 (HP detection portion in FIG. 5), and is the reset position for developing rotary rotation control. In this position, the development unit is not aligned with the attachment/detachment hole 37 (in FIG. 6C), so that even if a development unit replacement panel (not shown) were opened, replacement of the development unit would be prevented.

In the development position in FIG. 6B, the development roller of the development unit 54 is brought into proximity with the photosensitive drum 20, and the developing agent of the development unit 54 is supplied to the photosensitive drum 20. Also, in this position the memory 53a of the development unit 53, which has just finished the development process, is accessed in contact-free fashion by the serial interface 121, information in the memory 53a is read, and the remaining developing agent amount information is updated. If non-contact access is used, no physical force need be applied to the development device even during the development process, so that the development process is not affected by such access.

The attachment/detachment position in FIG. 6C is a position to which the development device is rotated when the replacement panel of the development unit is opened and a replacement button is pressed; in this position, the development unit 51 can be replaced via the replacement aperture 37. For example, each time the replacement button is pressed, the development device 50 is rotated by 90°, with control executed to rotate successive development units into the attachment/detachment position. Or, when the out-of-toner state is detected and development unit replacement is selected, in response to the replacement button, the development device 50 is rotated to the position of the development unit for which an out-of-toner state has been detected or to a position into which no development unit has been mounted. In place of the above replacement button, four mounting position buttons, corresponding to the four mounting positions, may be provided. In this case, when a mounting position button corresponding to a mounting position for replacement is pressed, the mounting position is rotated to the attachment/detachment position.

FIG. 7 shows the engaging means or element of the development device and development units. FIG. 7A shows the engaging structure between the cyan development unit 52 in the mounting position 50b and the support arm 55; the protrusion 52b of the development unit 52 and the depression 52c of the support frame 55 are formed so as to engage together. FIG. 7B shows the engaging structure between the magenta development unit 53 and the support frame 55 in the mounting position 50c; FIG. 7C shows the engaging structure between the yellow development unit 54 and the support frame 55 in the mounting position 50d. Similarly in these drawings, depressions 53c, 54c are provided on the side of the support frame 55 which engage with the protrusions 53b, 54b on the side of the development unit. FIG. 7D shows the structure of the black development unit 51 and the support frame 55 in the mounting position 50a thereof. No protrusion is formed in the black development unit 51, and accompanying this, no depression is formed in the support arm 55. Each development unit is inserted and retracted in the direction perpendicular to the plane of the paper, to be mounted or removed.

As is seen from the engaging structure shown in FIG. 7, protrusions 52b, 53b, 54b are provided at different positions on the CMY development units 52, 53, 54, and depressions 52c, 53c, 54c are provided at corresponding positions of the mounting positions 50b, 50c, 50d at which the former are mounted. By means of these engaging structure, the CMY development units can only be mounted in positions determined in advance. Mounting in positions other than predetermined positions is not possible. Using such physical engaging means in color printing mode ensures that CMYK development units are mounted in order in the predetermined positions, so that color printing is performed at high printing speed and with high image quality. On the other hand, no protrusion is formed on black development units 51, so that in addition to the black mounting position 50a, mounting in any of the other mounting positions 50b, 50c, 50d is also possible.

Figure 8:
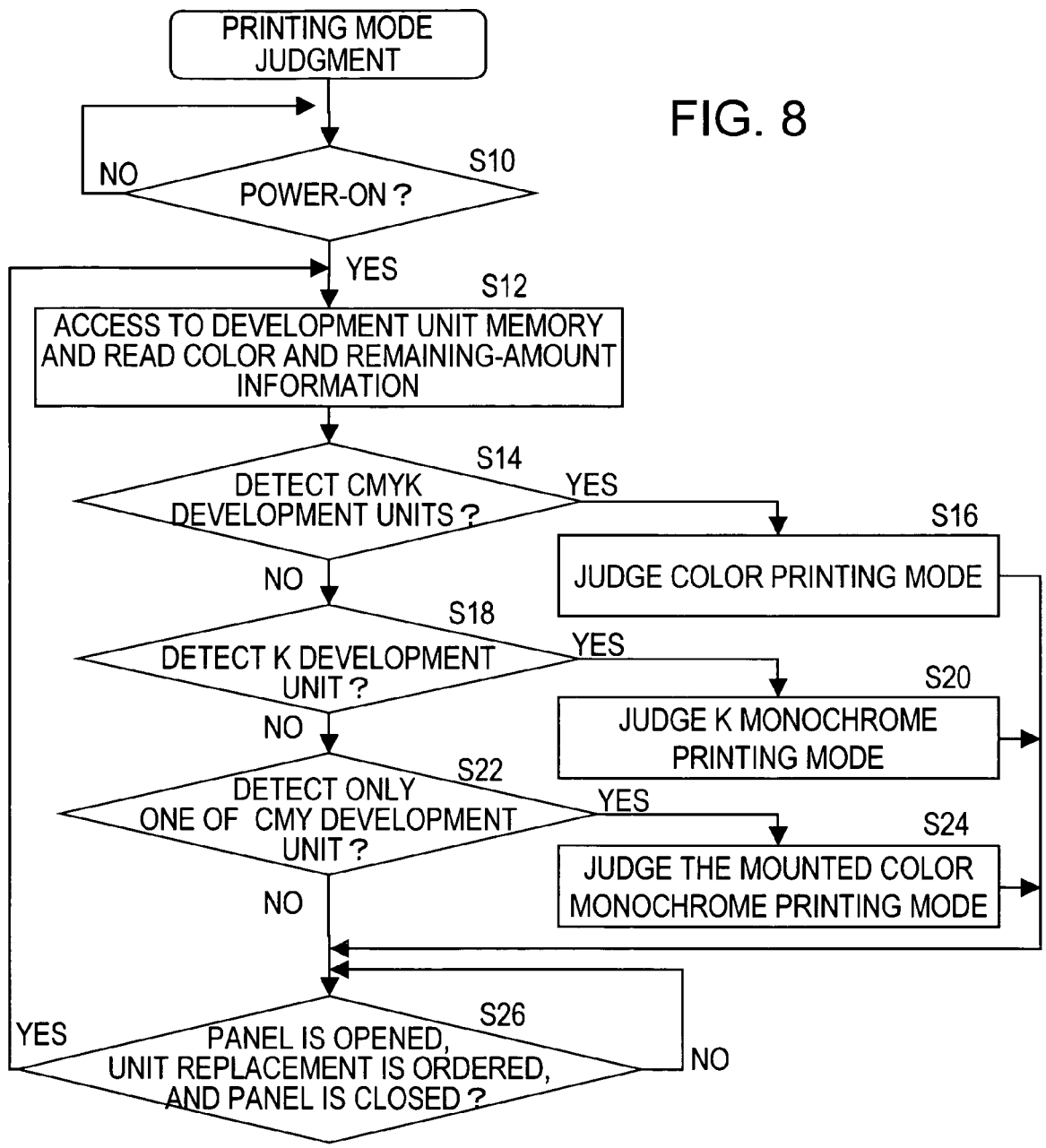
FIG. 8 is a flowchart showing printing mode decision operation in a present embodiment.

FIG. 8 is a flowchart showing printing mode decision operation in the present embodiment. FIG. 9 shows a decision table used in printing mode decision operation. When power is turned on (S10), the control unit 100 which is control means of the printer 10 rotates the development device 50 to a memory access position, accesses nonvolatile memory of a development unit installed in the development device, and reads the identification information for the development unit as well as color information and amount remaining information for the developer (S12). When it is recognized that black (K), magenta (M), cyan (C), and yellow (Y) development units are installed in the four installation positions (the installation positions for black, magenta, cyan, and yellow) of the development device (S14), the main controller 101 of the control unit 100 decides that the mode is color printing mode, and writes this data to nonvolatile memory 114a (S16). When the main controller 101 of the control unit recognizes that not all four of the color development units are installed, but that a black development unit is installed in one of the four installation positions (S18), it is decided that the mode is black monochrome printing mode, and this data is written to nonvolatile memory 114a (S20).

The decisions up to this time are as shown in the decision table of FIG. 9. That is, only development units in the predetermined CMY colors can be installed in the four installation positions, so that when it is decided that the mode is color printing mode (case R in FIG. 9), the CMYK development units are installed in the order of the predetermined direction of rotation. Hence in the four development processes in color printing mode, the four development units of the development device 50 are rotated in order to be brought in proximity with the photosensitive drum 20, enabling high-speed printing of high-quality images. If a configuration is employed in which the CMYK development units can be installed in arbitrary positions, then in order to perform development in CMYK order to achieve high image quality, the direction of rotation of the development device must be changed in bringing the CMYK development units into proximity with the photosensitive drum, and the complex rotation control may result in reduced development speed.

On the other hand, the printer is judged to be in black monochrome printing mode (cases A to Q in FIG. 9), regardless of the number of black development units installed, and the installation positions thereof. That is, there are no constraints on the installation positions of black development units, and so the user is permitted to install an arbitrary number of black development units in arbitrary positions, so that convenience can be enhanced.

When it is recognized that only a development unit in one of the CMY colors is installed (S22), it is decided that the mode is monochrome printing mode in the color of the developer of the installed development unit (S24). In this case, because CMY development units can only be installed in predetermined installation positions, a condition for this mode is that only one development unit be installed.

When the user opens the development unit replacement panel either in response to an out-of-toner display or when desired, presses a development unit replacement button to specify unit replacement, and closes the replacement panel after replacing development unit (S26), the control unit 100 executes the decision operation of the above steps S12 to S24.

Figure 10:
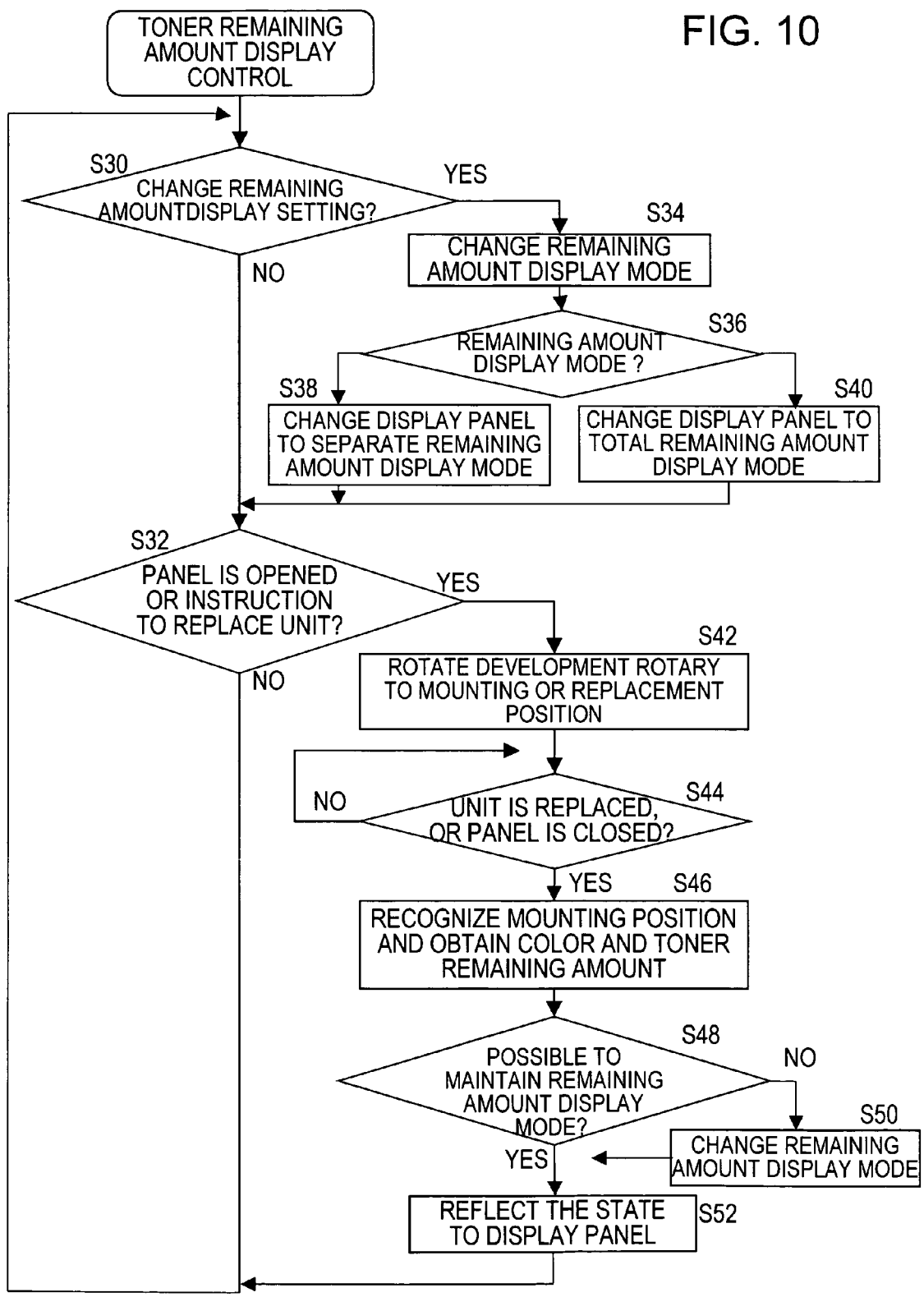
FIG. 10 is a flowchart showing toner remaining amount display control operation.

FIG. 10 is a flowchart showing toner remaining amount display control operation. FIG. 11 shows installation states of development units and examples of display panel displays in black monochrome printing mode. In black monochrome printing mode, installation of an arbitrary number of development units in the four installation positions is permitted. Further, in monochrome printing mode, it is possible to select either combined use, in which a plurality of installed development units are used in order, and when the amount of developer remaining in all development units becomes zero development unit replacement is performed, or separate use, in which a development unit having specified attributes is used according to the attributes of the plurality of installed development units, and development units are also replaced separately.

The user can select, either according to the mode of use or as desired, either total remaining amount display mode in which the total amount remaining for a plurality of development units is displayed on the display panel, or separate remaining amount display mode in which the amounts remaining for each of the plurality of development units are displayed separately. In separate remaining amount display mode, whether development units are installed and the amount of developer remaining are displayed for each installation position, for greater convenience when separately replacing or adding development units. On the other hand, in total remaining amount display mode the total amount remaining in monochrome printing mode using a plurality of development units can be displayed, for greater convenience when managing development units in the monochrome printing mode.

Figure 11A:
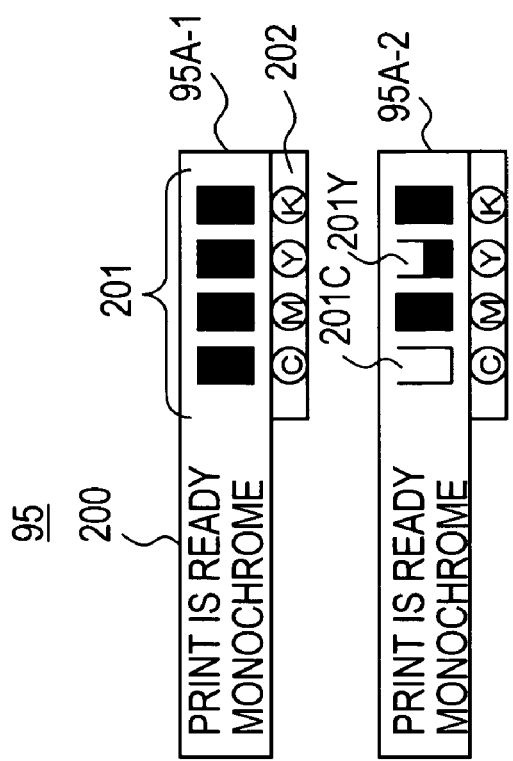
FIG. 11 shows installation states of development units and examples of display panel displays in black monochrome printing mode.
Figure 11A:
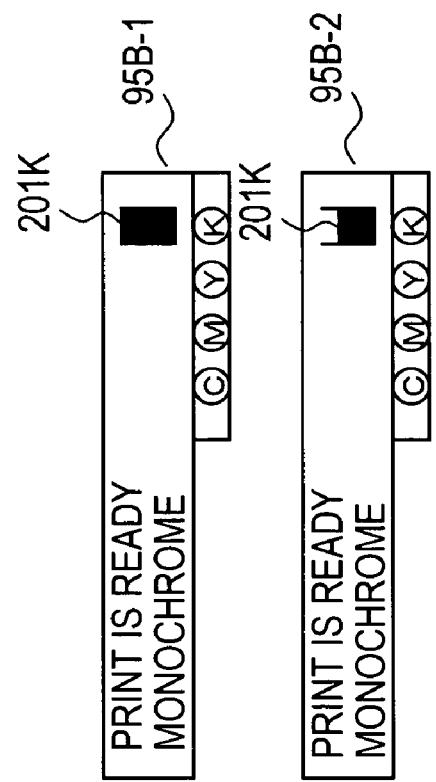
Figure 11A:
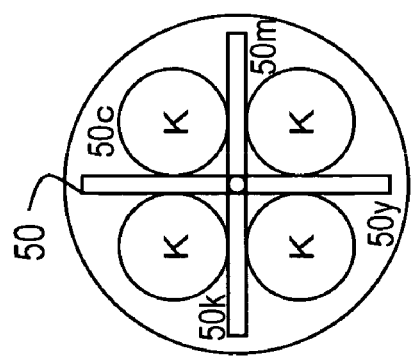
Figure 11B:
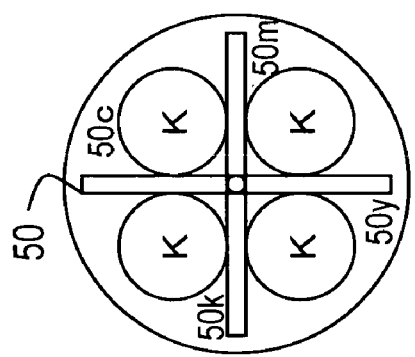

In FIG. 11A and FIG. 11B show examples of separate remaining amount display mode and of total remaining amount display mode when four black development units are installed in monochrome printing mode. In the separate display mode of FIG. 11A, the display 200 indicating monochrome printing mode, and the amount remaining information display 201 for the respective development units corresponding to the CMYK installation position display 202, are displayed on the display panel 95. The installation position display 202 need not be displayed within the display panel 95, but may be displayed on a seal affixed adjacent to the display panel. The display 95A-1 indicates that 100% of developer remains in all the developer units; display 95A-2 indicates that the amount remaining in the cyan installation position is zero (201C), and that the amount remaining in the yellow installation position is approximately 50% (201Y). The amount remaining in the cyan installation position is zero, but the fact that a development unit is installed is indicated. In the total remaining amount display mode shown in FIG. 11B, the total amount remaining information display 201K is shown in the black installation position. In display 95B-1, the total amount remaining is 100%, but in display 95B-2, the amount remaining is indicated as approximately 60%. In total remaining amount display mode, the amount remaining is not displayed in correspondence with installation positions. That is, when comparing displays 95A-2 and 95B-2, even when the developer amount remaining states are the same, in the separate remaining amount display mode of display 95A-2 the amounts remaining are shown separately for four development units, whereas in the total remaining amount display mode of display 95B-2 the total amount remaining, in percent, is displayed for the four development units.

In FIGS. 11C and 11D show examples of separate remaining amount display mode and of total remaining amount display mode when two black development units are installed in monochrome printing mode. In the separate display mode of FIG. 11C, the display 200 indicating monochrome printing mode, and, corresponding to the CMYK installation position display 202, the display indicating units are not installed in the CY installation positions, and the separate amount remaining information displays 201M and 201K for the development units in the MK installation positions, are displayed. The display 95C-1 indicates that 100% of the developer remains in the development unit installed in position M and that approximately 30% of the developer remains in the development unit installed in position K; display 95C-2 shows display 201K indicating zero amount remaining in the K installation position, and display 201M indicating 100% remaining in the M installation position. In the total remaining amount display mode of FIG. 11D, the total amount remaining information display 201K is shown in the black installation position. Display 95D-1 indicates that in total approximately 70% remains; display 95D-2 indicates that 50% remains.

As a modified example, the displays 95B, 95D in total remaining amount display mode shown in FIGS. 11B and 11D may instead display, for each of the installation position displays 202 corresponding to the installation positions of installed development units, show average values of the remaining amounts of developer in all the installed development units. In this modified example, when development units are installed in all installation positions, the developer amount remaining states for development units shown in the displays 95A-2 and 95B-2 indicate that approximately 60% remains for all of the CMYK positions in the installation position display 202. When development units are installed in only a portion of the installation positions, the developer amount remaining states for development units shown in the displays 95C-2 and 95D-2 indicate that approximately 50% remains in each of the M and K positions of the installation position display. That is, in this modified example, in total remaining amount display mode, the average value of the amount remaining for the development units is displayed at each of the installation positions, so that installed positions and the total average amount remaining are shown.

In this embodiment, either the toner separate remaining amount display mode or the total remaining amount display mode may be set by a user from an operation panel provided in the printer, a printer driver installed in the host computer, or similar. Further, when the user sets automatic discrimination mode, one of the remaining amount display modes is set automatically based on color information, identification information and similar for installed development units.

Returning to FIG. 10, when an operation is performed by the user, from the display panel/operation panel 95, to change the remaining amount display mode (S30), the main controller 101 changes the remaining amount display mode to the specified mode, and causes amounts remaining to be displayed on the display panel/operation panel 95 in the separate remaining amount display mode or total remaining amount display mode, according to the new remaining amount display mode (S36, S38, S40). When the user installs a plurality of black development units, and uses the development units selectively according to attributes corresponding to the identification information for the respective development units, such as for example the user name, toner quality, and similar, for example, separate remaining amount display mode is selected. In separate remaining amount display mode, the amounts remaining in development units corresponding to installation positions are displayed separately, so that information can be displayed which is appropriate for replacement and other management of the respective development units. On the other hand, when the user installs a plurality of black development units, and uses all the development units without distinguishing therebetween, and replaces the development units when the total amount remaining in all the development units has reached zero, then, for example, total remaining amount display mode is selected. Total remaining amount display mode is suitable for combined management of a plurality of development units.

When the development unit replacement panel is opened and a replacement button is pressed, or by some other means development unit replacement is specified (S32), the engine controller 102 controls the development device 50 to rotate to the development unit installation position or replacement position (S44). When development unit replacement or additional installation has been performed and the replacement panel is closed (S46), the engine controller 102 accesses the nonvolatile memory of the development unit installed either newly or as a replacement, and reads and acquires color information, amount remaining information, and identification information for the development unit corresponding to the installation position (S46). This information is sent to the main controller 101.

The main controller 101 uses the acquired color information and remaining amount information to decide whether the current remaining amount display mode can be maintained (S48). For example, when the current mode is the total remaining amount display mode, if any of the installation positions no longer has a development unit installed, the main controller 101 decides that the current display mode cannot be maintained, and changes to separate remaining amount display mode (S50). Or, when the amount remaining in any of the development units in installation positions reaches zero or falls below a prescribed amount, the main controller 101 decides that the current remaining amount display mode cannot be maintained, and changes to the separate remaining amount display mode. The amount remaining is then displayed in the changed or unchanged remaining amount display mode, based on amount remaining information (S52).

When the user sets a prescribed attribute corresponding to the identification information of a development unit from the operation panel 95, and makes settings so as to use the development unit corresponding to the attribute, the main controller 101 automatically changes the mode from total remaining amount display mode to separate remaining amount display mode. A flowchart for this operation is not shown. In addition to making automatic changes corresponding to color information obtained from the memory of installed development units, the main controller 101 may also automatically change the remaining amount display mode setting in response to other conditions.

Upon detection that development units of different colors are installed in at least a portion of the four installation positions, the main controller 101 automatically sets the separate remaining amount display mode.

FIG. 12 shows installation states of development units in color printing mode and in black monochrome printing mode and examples of display panel display. FIG. 12E shows the state of color printing mode with CMYK development units installed in the four CMYK installation positions. In this case, the display panel 95 shows the display 200 indicating color printing mode, and the separate remaining amount display 201 for the respective color development units corresponding to the CMYK installation positions. In display example 95E-1, the amounts remaining are indicated to be 100% for all development units; in display example 95E-2, the amounts remaining for the respective development units are not 100%.

Figure 12E:
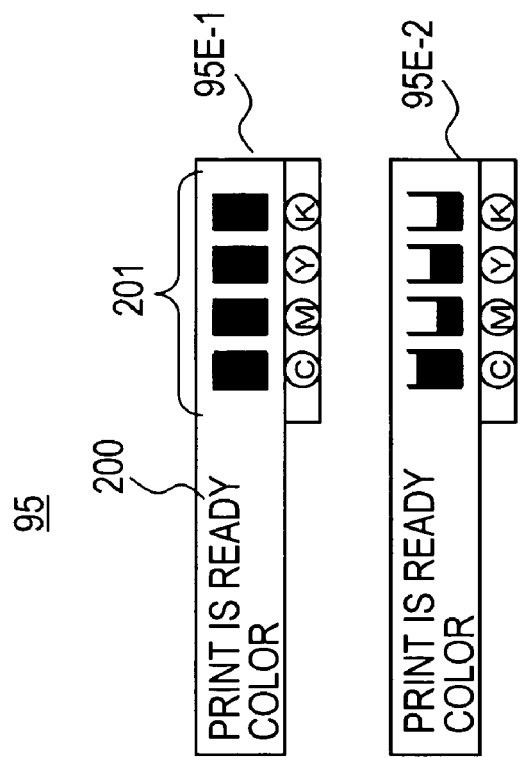
FIG. 12 shows installation states of development units in color printing mode and in black monochrome printing mode and examples of display panel display; and, FIG. 13 shows examples of display by the printer driver in the host computer of development unit installation positions and toner remaining amounts.
Figure 12E:
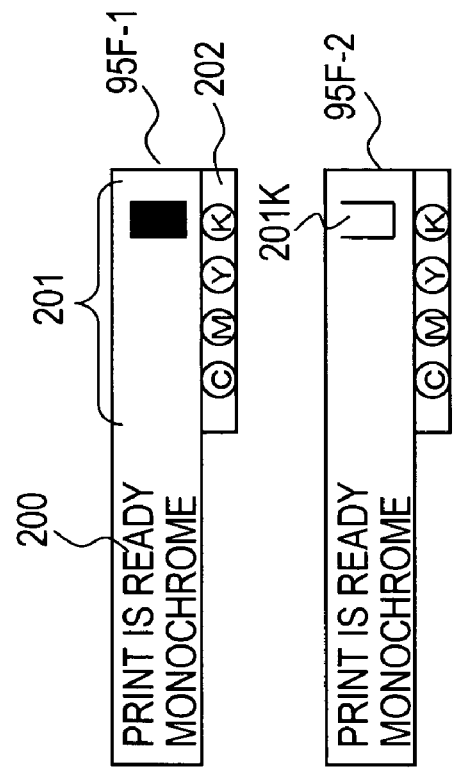
Figure 12E:
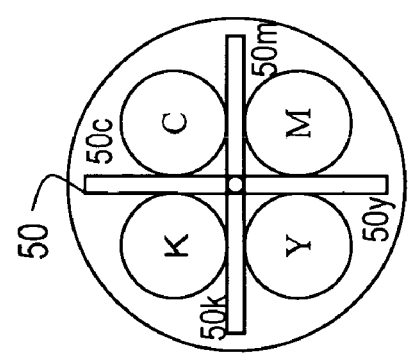
Figure 12F:
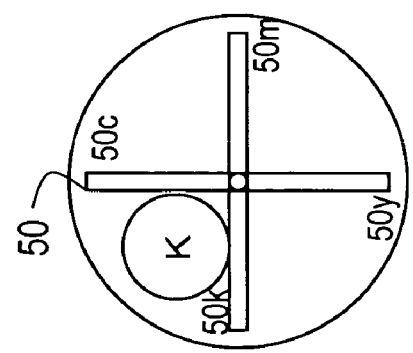

FIG. 12F shows the state of monochrome printing mode with only a black development unit installed in the black installation position 50k. In this case, the display panel 95 shows the display 200 indicating monochrome printing mode, and the remaining amount display 201K for the development unit corresponding to the black installation position. In display example 95F-1, the amount remaining is shown as 100%, and in display example 95F-2 the amount remaining is zero, but the display indicates that a development unit is installed.

In this embodiment, even if a user installs four black development units and sets the mode to total remaining amount display mode, if thereafter any of the development units is removed, or the amount remaining falls to zero or falls below a prescribed amount, the mode is automatically changed to separate remaining amount display mode. However, this automatic changing function can be set and changed by the user. When changing to separate remaining amount display mode, the user can separately verify whether a unit is installed and the amount remaining for each of the CMYK installation positions, and a display can be provided which is convenient in subsequent replacement or addition of development units or other management processes. Similar advantages are obtained when development units of different colors are installed in the installation positions of the development device, and also when settings are made so as to use development units employing attributes corresponding to the identification information of development units.

Figure 13:
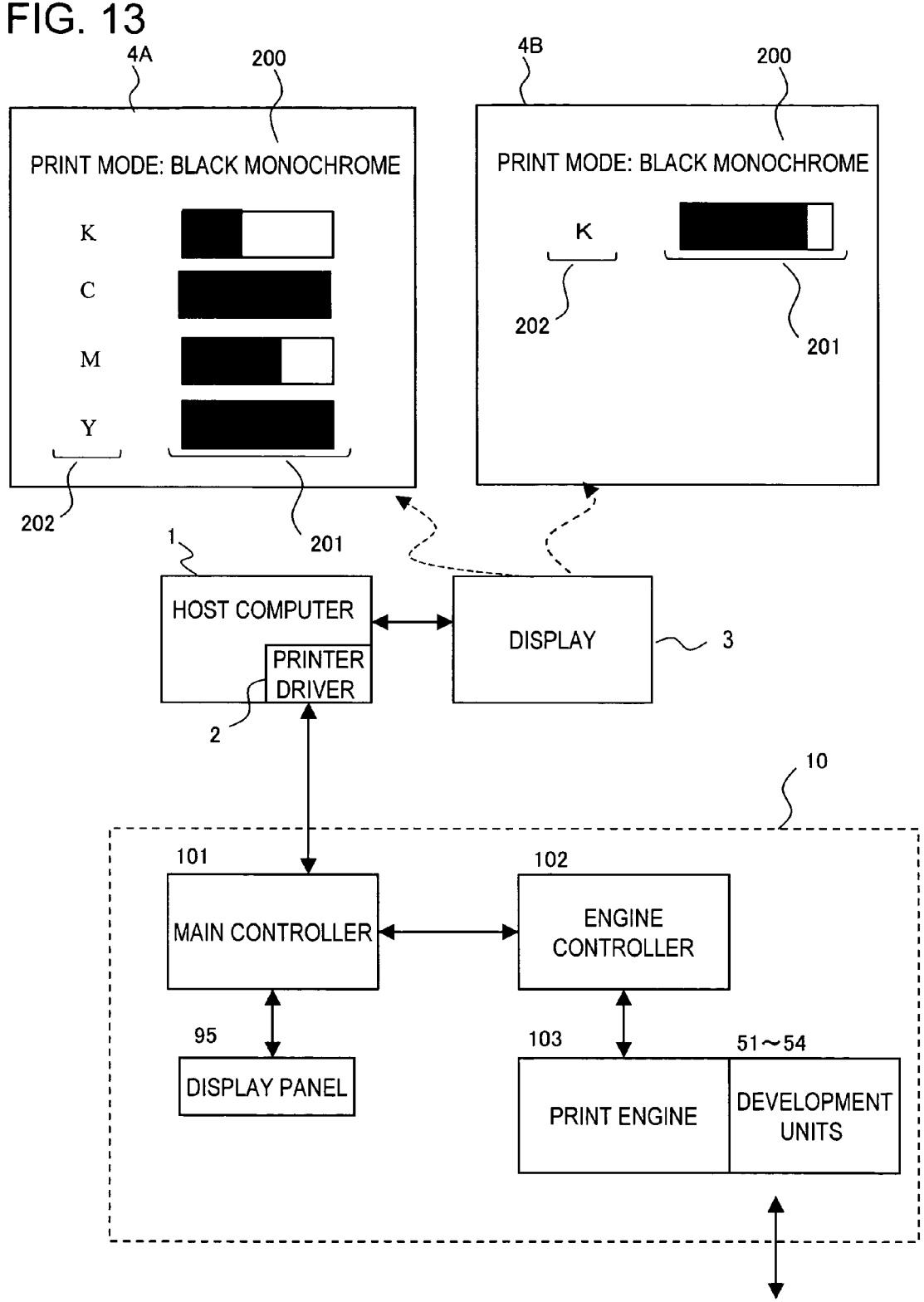

FIG. 13 shows examples of display by the printer driver in the host computer of development unit installation positions and toner remaining amounts. The host computer 1 is connected to the printer 10 either directly, or via a network, enabling communication either wirelessly or through a cable; and amounts remaining for development units can be displayed on the display 3, in either separate remaining amount display mode 4A or in total remaining amount display mode 4B, by the printer driver 2 installed in the host computer 1.

At power-on or at other times, the main controller 101 acquires the installation positions, color information and toner amount remaining information for development units 51 to 54 in the engine 103 via the engine controller 102, and sends this information to the printer driver 2. At the same time, the remaining amount display mode set and stored in the memory of the main controller 101 is also sent to the printer driver 2. Thereafter, when the state of installation of development units changes, and when the toner amount remaining information is changed also, this information is sent to the printer driver. Also, when the user changes the remaining amount display mode, and when the remaining amount display mode changes due to automatic discrimination also, the main controller 101 sends the mode change information to the printer driver 2.

In the case of the separate remaining amount display mode, the printer driver 2 displays the printing mode 200, displays the installation positions 202, and displays the amount remaining information for development units in each installation position 201, as in the image of 4A. When in total remaining amount display mode, the printer driver 2 displays the color printing mode 200, the black installation position display 202, and the development unit amount remaining information display 201, as in image 4B.

The remaining amount display mode and the developer amounts remaining can be confirmed in the monitor screen 3 of the host computer 1, as shown in the images 4A and 4B, for greater convenience in development unit replacement, addition, and other management.

Displays in color printing mode are similar to displays on the display panel explained in FIG. 12.

In the above embodiment, black monochrome printing mode has been explained; however, this embodiment can also be applied to monochrome (single-color) printing modes in any of the CMY colors other than black. However, in this case, the joining means permits only a single development unit to be installed.

What is claimed is:

1. An image formation device, comprising:
   an image carrier which forms latent images; and
   a development device into which a plurality of development units housing developer are detachably installed, wherein said image formation device operates in monochrome printing mode when development units of the same color are installed in a plurality of installation positions of said development device, and further comprises:
   display unit displaying amount of developer remaining within said development units; and,
   control unit for executing control to enable switching between separate remaining amount display mode, in which information on the remaining amount of developer in each of the plurality of development units installed is displayed on said display unit corresponding to said plurality of installation positions, and total remaining amount display mode, in which amount remaining information based on total amount of developer remaining in said plurality of installed development units of the same color is displayed on said display unit.

2. The image formation device according to claim 1, wherein said development units have storage device storing color information and amount remaining information for developer housed therein, and said control unit acquires color information and amount remaining information stored in said storage device of development units installed in the plurality of installation positions of said development device.

3. The image formation device according to claim 1 or claim 2, further comprising input unit to set said remaining amount display modes, and wherein, in response to the setting through the input unit of said separate remaining amount display mode or total remaining amount display mode, said control unit displays amount remaining information on said display unit in the set remaining amount display mode.

4. The image formation device according to claim 1 or claim 2, wherein, when development units of the same color are installed in all installation positions, said control unit sets the total remaining amount display mode.

5. The image formation device according to claim 1 or claim 2, wherein, when no development unit is installed in one of the installation positions, or when the amount of developer remaining in a development unit in one of the installation positions is zero or is below a prescribed amount, said control unit sets said separate remaining amount display mode.

6. The image formation device according to claim 1 or claim 2, wherein, when identification information of development units of the same color installed in said plurality of installation positions correspond to different attributes, said control unit sets said separate remaining amount display mode.

7. The image formation device according to claim 6, wherein attributes corresponding to identification information of said development units comprise user information using the development unit and the quality of the developer.

8. The image formation device according to claim 1 or claim 2, wherein, when development units of a plurality of colors for color printing are installed in installation positions of said development device, operation is in color printing mode, and said control unit causes said display unit to perform display enabling differentiation between said color printing mode and monochrome printing mode, based on said acquired color information.

9. The image formation device according to claim 1, wherein said control unit outputs as appropriate, to a host computer provided so as to enable communication with the image formation device, data indicating which of said separate remaining amount display mode and total remaining amount-display mode is set, and data to cause display in the respective remaining amount display modes, and causes the host computer to perform display in said set mode.

10. An image formation device, comprising:
  an image carrier which forms latent images; and
  a development device into which a plurality of development units housing developer are detachably installed, and capable of communicating with a host computer,
  wherein said image formation device operates in monochrome printing mode when development units of the same color are installed in a plurality of installation positions of said development device, and further comprises:
  control unit for executing control to enable switching between separate remaining amount display mode, in which information on remaining amount of developer in each of the plurality of development units installed is displayed corresponding to said plurality of installation positions, and total remaining amount display mode, in which amount remaining information based on total amount of developer remaining in said plurality of installed development units of the same color is displayed; and wherein
  the control unit outputs, as appropriate, data indicating which of said separate remaining amount display mode and total remaining amount display mode is set, and data to cause display in the respective remaining amount display modes, and causes the host computer to display data in said set mode.

11. The image formation device according to claim 10, wherein said development units have storage device for storing color information and amount remaining information for developer housed therein, and said control unit acquires color information and amount remaining information stored in said storage device of development units installed in the plurality of installation positions of said development device.

* * * * *